(12) United States Patent
Cruz et al.

(10) Patent No.: US 8,304,461 B2
(45) Date of Patent: Nov. 6, 2012

(54) PROCESS FOR MAKING POLYMER COMPOSITES HAVING THERMOPLASTIC PROPERTIES

(75) Inventors: Carlos A. Cruz, Holland, PA (US); Willie Lau, Lower Gwynedd, PA (US); Joseph M. Rokowski, Riegelsville, PA (US); Qi Wang, Wuhou District (CN)

(73) Assignee: Rohm and Haas Company, Philadelphia, PA (US)

( * ) Notice: Subject to any disclaimer, the term of this patent is extended or adjusted under 35 U.S.C. 154(b) by 233 days.

(21) Appl. No.: 12/459,975

(22) Filed: Jul. 10, 2009

(65) Prior Publication Data

US 2010/0016456 A1    Jan. 21, 2010

Related U.S. Application Data

(60) Provisional application No. 61/134,581, filed on Jul. 11, 2008.

(51) Int. Cl.
*C08J 11/04* (2006.01)
(52) U.S. Cl. ............. 521/45.5; 521/40; 521/45; 524/68; 524/922; 516/9; 516/98; 516/198; 528/480; 528/499; 528/502 R; 528/502 E; 528/502 F; 428/141; 428/142; 428/144; 428/147; 525/50; 525/55; 525/56; 525/232
(58) Field of Classification Search .................... 521/40, 521/40.5, 41, 43.5, 44, 44.5, 45, 45.5, 46, 521/47, 48; 516/9, 98, 198; 524/68, 69, 524/70, 71, 76, 922; 428/141, 142, 144, 428/147; 525/50, 55, 56, 232, 238, 242
See application file for complete search history.

(56) References Cited

U.S. PATENT DOCUMENTS

| | | | |
|---|---|---|---|
| 5,710,196 A | 1/1998 | Willard | |
| 5,743,471 A | 4/1998 | Ivanov | |
| 5,985,366 A * | 11/1999 | Wright | .......................... 427/340 |
| 6,417,251 B1 | 7/2002 | Brady | |
| 2006/0074135 A1 | 4/2006 | Shahidi et al. | |
| 2006/0151643 A1 | 7/2006 | Pirelli et al. | |
| 2007/0173567 A1 | 7/2007 | Ishino | |

FOREIGN PATENT DOCUMENTS

| | | |
|---|---|---|
| GB | 612509 | 11/1944 |
| JP | 11323022 A | 11/1999 |
| SU | 694516 | 10/1979 |
| WO | WO 2007/049137 | 5/2007 |

OTHER PUBLICATIONS

SKS-30ARK specification sheet, Astlett Rubber Inc., www.astletrubber.com.*
Felder et al, "Elementary Principles of Chemical Processes", Wiley and Sons, 1978, p. 106.*
Xu, Xi, et al., "Pan Mill Type Equipment Designed for Polymer Stress Reactions" The Institute of Materials, Mar. 20, 1996, pp. 152-158, Chengdu, China.
Cui Yong, et al., "Application of Solid Phase Shear Pulverization in Recycling of Waste Rubber", Liaoning Chemical Industry, vol. 33, Issue 5, pp. 284-286, May 31, 2004.

* cited by examiner

*Primary Examiner* — Frances Tischler
(74) *Attorney, Agent, or Firm* — Andrew E. C. Merriam

(57) ABSTRACT

The present invention provides methods of making composite materials comprising combining particles of crosslinked rubber with coagulated aqueous polymer dispersions to form a mixture in aqueous dispersion, and subjecting the aqueous dispersion mixture to solid state shear pulverization to form materials that can be processed as thermoplastics at crosslinked rubber concentrations of from 10 to as high as 95 wt. %, based on the total solids of the material. The method may further comprise kneading the pulverized product to form useful articles, such as roofing membranes and shoe soles.

10 Claims, No Drawings

PROCESS FOR MAKING POLYMER COMPOSITES HAVING THERMOPLASTIC PROPERTIES

This application claims the benefit of priority under 35 U.S.C. §119(e) of U.S. Provisional Patent Application No. 61/134,581 filed on Jul. 11, 2008.

The present invention relates to a process for making a composite material from crosslinked rubber and a coagulated aqueous polymer dispersion. More particularly, it relates to a process for making a composite that behaves like a thermoplastic from waste rubber vulcanizate and a coagulated aqueous polymer dispersion.

This invention was made under a joint research agreement between the Rohm and Haas Company of Philadelphia, Pa. and the State Key Laboratory of Polymer Materials Engineering at Sichuan University of Chengdu, Peoples Republic of China.

Much effort has been devoted to the reuse of rubber articles, particularly crosslinked or vulcanized rubber. The desire to find new uses for waste motor vehicle tires is particularly acute because there are so many of them, and their disposal presents problems. Governments have been trying hard to keep as many of them as possible out of landfills because of dwindling landfill space, among other reasons, and disposal of the tires by incineration carries with it concerns about atmospheric contamination by particulate emissions and potentially harmful compounds. Waste tires have been used, for example, as fuel in cement-making operations; as fillers (when finely ground) in new tires, outdoor athletic surfaces and road asphalt; or as mulch.

Using ground tire rubber (GTR) as a filler presents difficulties, particularly when the desired end product is thermoplastic, because GTR is a crosslinked thermoset composition. For example, extruded articles made from pure ground tire rubber are weak and inflexible because the grains of the ground tire cannot fuse well together as they are a thermoset composition. Thus, to date, when ground tire is added to thermoplastic compositions as a filler, there is an upper limit of ground tire content before physical properties are impaired, and this upper limit is approximately 5-10% ground tire rubber. The same is true when ground tire rubber is used in new tires.

One improvement in the processing of waste vulcanized rubber comprises solid-state shear pulverization ($S^3P$). $S^3P$ is a milling method where the particle size reduction is effected by tear, shear, abrasion, or attrition and is often carried out under ambient conditions (see, for example, Chapters 2 and 3, Solid-State Shear Pulverization, K. Khait and S. Carr, Technomic Publishing Company, Inc. 2001). In addition to size reduction, $S^3P$ has been demonstrated to induce mixing or compatibilizing of multicomponent mixtures as well as mechanochemistry as a result of radicals generated from the rupture of carbon-carbon bonds. Several types of $S^3P$ processing technology and equipment have been developed since the 1970s, including the Berstorff pulverizer, Extrusion Pulverization, Rotating Grinding Mill, and Pan Mill (Polymer Engineering and Science, June 1997, Vol. 37, No. 6, 1091-1101; Plastics, Rubber and Composites Processing and Applications 1996, Vol. 25, No. 3, 152-158). Both the rotating grinding mill and the pan mill comprise a fixed surface and a rotating surface with each having different designs of the contact surfaces. However, intimate mixing of different solid materials is not easily achieved using these solid state pulverizing techniques without the use of high temperatures to produce molten materials.

There has been substantial effort in recycling or recovering waste tires by mixing with a solid thermoplastic, such as polyethylene, to convert the rubber tire to a material that can be processed. $S^3P$ has been applied to such mixtures. However, this approach requires melt processing of the thermoplastic/rubber mixture at high temperature along with numerous processing additives. Other known methods include the preparation of polyolefin-grafting-polar monomer copolymer by mechanochemical methods, and preparing rubber powder with high surface activity from waste tire rubber, which can be used to form polymer/ rubber powder composites.

Additionally, there have been attempts to combine natural or synthetic rubber latexes with GTR. Japanese Patent Application No. 2007231153, to Bridgestone, discloses a method of producing a wet masterbatch of natural rubber latex, carbon black and powdered rubber (GTR), which mixture is coagulated and then dried and extruded. Such methods, however, fail to meet the need for methods to produce useful thermoplastic materials from recycled thermoset rubber and a thermoplastic polymer, where the materials comprise >10% recycled rubber.

Although waste rubber tires have received much attention, the problem of recycling rubber remains far more reaching than waste tires. There remains a need for methods to combine thermoset polymers, like crosslinked rubber, with thermoplastic polymers, such that the new composites can be effectively reused as thermoplastic compositions, without loss of mechanical properties of the constituent polymers.

The inventors have endeavored to find a solution to the problem of producing a useful thermoplastic material from recycled thermoset rubber and a thermoplastic latex polymer that retains the mechanical properties of the constituent polymers even where the proportion of thermoset rubber is >10 wt. % of the composite.

STATEMENT OF THE INVENTION

According to the present invention methods of making composite materials comprise:

(a) coagulating one or more aqueous polymer dispersion to produce a coagulated polymer dispersion with a weight average particle size of from about 1 micron to about 1,000 microns;

(b) combining particles of one or more crosslinked rubber with the coagulated aqueous polymer dispersion to form a mixture in aqueous dispersion;

(c) subjecting the aqueous dispersion mixture to solid state shear pulverization, thereby reducing the particle size of the crosslinked rubber; and, (d) reducing the moisture content of the mixture.

In one embodiment of the invention, the method further comprises kneading the mixture prior to forming an article.

In another embodiment of the invention, coagulating the one or more aqueous polymer dispersion is carried out in the presence of the particles of one or more crosslinked rubber to form the mixture in aqueous dispersion.

In yet another embodiment, the crosslinked rubber is obtained, at least in part, from recycled tires, with a particle size range of 150 micron sieve particle size (80 mesh) or more, or 11,100 micron sieve particle size (2 mesh) or less, or 203 micron sieve particle size (60 mesh) or more, or 3,350 micron sieve particle size (6 mesh) or less.

In yet still another embodiment, the aqueous polymer dispersion that is coagulated is obtained from an emulsion polymer dispersion, preferably, an acrylic emulsion polymer.

In a different embodiment, the coagulated aqueous polymer dispersion is obtained from the waste stream of an emulsion polymer manufacturing facility.

In yet even still another embodiment of the invention, reducing the moisture content of the mixture comprises isolating the solid content of the mixture.

In further yet even another embodiment of the invention, the solid state shear pulverization comprises pan milling or disk milling.

In still further yet even another embodiment of the invention, the coagulated aqueous polymer dispersion comprises (co)polymers having polymerized units of one or more functional monomers with functionality chosen from carboxy acid functionality, phosphorus acid functionality, hydroxy functionality, amine functionality, acetoacetoxy functionality, silyl functionality, epoxy functionality, cyano functionality, isocyanate functionality, and combinations thereof. The inventors have discovered methods of producing a thermoplastic materials from recycled thermoset rubber and thermoplastic polymer which comprise co-milling an aqueous slurry of a coagulated latex comprising a thermoplastic polymer and a thermoset crosslinked rubber under ambient conditions, such that the product can be easily isolated and processed into useful articles.

The inventive method is particularly suitable in the processing of acrylic polymers and crumb rubber tires as the thermoplastic and thermoset polymers, respectively, and can produce useful composite materials comprising >10%, and up to 95% of thermoset rubber. The wet milling method is low cost, efficient, and with both better heat dissipation capacity and low fouling of the equipment. The method comprises a coagulation treatment of the latex polymer either before or after mixing with the thermoset rubber particles. Coagulation of the latex polymer particles produces polymer particles with average particle size ranging from about 1 micron to about 1,000 microns, which is in the general size range of the starting rubber particles, and enables intimate mixing of the components and chemical and/or mechanical interaction between them.

The present inventors discovered methods to use latex polymers in conjunction with GTR or crosslinked rubber under solid state grinding conditions. Because latex particles are much smaller than coarse grade GTR (approximately three orders of magnitude different: 150 nm vs. 150 microns), slurries prepared by dispersing GTR with conventional latexes tend to phase separate, with the respective particles unchanged. Further, the present inventors discovered that solid state milling techniques can be suitable in the wet milling of slurries. The slurry method of the present invention provides a uniform mixture of the crumb tire rubber and the acrylic polymer that can be readily introduced into the mill and facilitates isolation of the product mixture of latex polymer with crosslinked rubber or GTR, even by conventional methods such as centrifugation and filtering which does not generally work with commercial latexes because they are generally colloidally stable.

The methods of the present invention allow the production of composite materials made wholly, or partly, from waste products or recycled materials. For example, the thermoset rubber may be ground tire rubber (GTR) derived from waste motor vehicle tires, and the thermoplastic polymer may be derived from latex (co)polymers obtained from a waste stream, such as from an emulsion polymer manufacturing facility.

As used herein, the term "ground tire rubber" (GTR) refers to a rubber material produced in finely ground form, such as crumb rubber, for the purpose of reuse. This material is predominantly comprised of crosslinked, and thermoset, rubber from waste tires, but may include other waste rubber from other sources. GTR is supplied commercially in many particle size ranges, with the broadest classes of GTR being generally referred to as "ground rubber" (crumb rubber of 1,520 micron sieve particle size, i.e. 10 mesh, or smaller), and "coarse rubber" (comprising particles of one quarter inch and larger, and with a maximum size of 13,000 mesh sieve particle size (one half inch) in the largest dimension).

As used herein, the term "aqueous polymer dispersion" means a dispersion of polymeric particles in water, which particles exclude the crosslinked rubber particles.

As used herein, the term "latex polymer" refers to a stable dispersion of polymeric microparticles (particle size <1 micron) in water.

As used herein, the term "emulsion polymer" means a polymer made in water or a substantially aqueous solution by an emulsion polymerization process.

As used herein, the term "pulverization" refers to any process that results in a reduction in the particle size of solid particulate matter, effected by tear, shear, abrasion, or attrition.

As used herein, the term "solid state shear pulverization" or "$S^3P$" refers to a non-melting pulverization of a material in the solid state to impart intense shear stress to the solid particles, and which may be carried out with the material at ambient temperatures or with cooling.

As used herein, the term "forming" refers to an operation that manipulates a thermoplastic material to give a shaped article.

Unless otherwise indicated, any term containing parentheses refers, alternatively, to the whole term as if no parentheses were present and the term without them (i.e. excluding the content of the parentheses), and combinations of each alternative. Thus, the term (co)polymer refers to a homopolymer or copolymer. Further, (meth)acrylic refers to any of acrylic, methacrylic, and mixtures thereof.

As used herein, unless otherwise indicated, the word "copolymer" includes, independently, copolymers, terpolymers, block copolymers, segmented copolymers, graft copolymers, and any mixture or combination thereof.

As used herein, the phrase "alkyl" means any aliphatic alkyl group having one or more carbon atoms, the alkyl group including n-alkyl, s-alkyl, i-alkyl, t-alkyl groups or cyclic aliphatics containing one or more 5, 6 or seven member ring structures.

As used herein, the phrases "$(C_3-C_{12})$—" or "$(C_3-C_6)$—" and the like refer to compounds containing 3 to 12 carbon atoms and 3 to 6 carbon atoms, respectively.

The term "unsaturated carboxylic acid monomers" or "carboxy acid monomers" includes, for example, (meth)acrylic acid, crotonic acid, itaconic acid, 2-methyl itaconic acid, $\alpha,\beta$-methylene glutaric acid, monoalkyl fumarates, maleic monomers; anhydrides thereof and mixtures thereof. Maleic monomers include, for example, maleic acid, 2-methyl maleic acid, monoalkyl maleates, and maleic anhydride, and substituted versions thereof.

The term "unsaturated sulfonic acid monomers" includes, for example, 2-(meth)acrylamido-2-methylpropanesulfonic acid and para-styrene sulfonic acid.

As used herein, the phrase "aqueous" or "aqueous solution" includes water and mixtures composed substantially of water and water-miscible solvents.

As used herein, "wt %", "wt. %" or "wt. percent" means weight percent. As used herein, the phrase "based on the total weight of polymer composite solids" refers to weight amounts of any given ingredient in comparison to the total weight amount of all the non-water ingredients in the polymer composite (e.g., latex copolymers and ground tire rubber).

As used herein, unless otherwise indicated, the term "sieve particle size" refers to the particle size of a material that results from the sample passing through a sieve of the given particle size. For example, ground tire rubber milled so that it passes through a 203 micron sized sieve (60 mesh) is referred to as having a 203 micron sized sieve particle size. For a given material, a mesh sieve particle size will be larger than the weight average particle size.

The particle size and particle size distribution of the coagulated aqueous polymer dispersions described herein were measured using a Malvern Mastersizer 2000™ Particle Size Analyzer (Malvern Instruments Ltd., Malvern, Worcestershire, UK). This instrument uses a light scattering technique and the particle size obtained is a weight average particle size.

The crosslinked rubber may be any rubber that has been crosslinked and is not restricted to rubber obtained by grinding waste tires. For example, the crosslinked rubber may have been derived from one or more types of rubber selected from natural rubber, synthetic rubber, and derivatives thereof. Examples of synthetic rubber include diene-based polymers such as isoprene, cis-1,4-polyisoprene, styrene-butadiene, styrene-acrylonitrile-butadiene, acrylonitrile-butadiene, cis-1,4-polybutadiene, ethylene-propylene-diene-monomer rubber (EPDM), chloroprene rubber, halogenated butyl rubber, and the like.

Preferably, the crosslinked rubber of the composite material is a recycled rubber, and most preferably it is obtained, at least in part, from recycled rubber from ground motor vehicle tire polymer. Therefore, the rubber may be vulcanized (crosslinked) or hyperoxidized rubber and may contain one or more species such as crosslinking agent, sulfur, vulcanizing accelerator, antioxidant, ozone degradation inhibitor, preservative, process oil, zinc oxide (ZnO), carbon black, wax, stearic acid, and the like, as are often present in waste rubber products. Preferably, the input rubber has been pre-stripped of any non-rubber content, such as for example, steel belt or cloth, as are often present in waste motor vehicle tires. Commercial sources of GTR are generally provided in this manner.

The present invention is not limited by the shape of the starting crosslinked rubber particles. The rubber for use in the $S^3P$ process may be, for example, in shredded form, rubber pellets, rubber strands, or particles such as crumb rubber, or a rubber powder, which particulate forms are available commercially and produced by methods known to those skilled in the art. Rubber particle sizes as introduced into the $S^3P$ process, although useable, are less practical above 11,100 micron sieve particle size (2 mesh). Generally, the rubber particle size ranges 7,000 micron sized sieve particle size (3 mesh) or less. The larger particle sizes may require further iterations of wet milling. Additionally, the speed of rotation of and the design of the contact surfaces can also impact the effectiveness of the wet milling. Preferably, the crosslinked rubber has a particle size of 3,350 micron sieve particle size (6 mesh) or less, or 150 micron sieve particle size (80 mesh) or more, or, more preferably, 203 micron sieve particle size (60 mesh) or more. The resulting particle size of the $S^3P$ milled rubber is generally the same size as that of the coagulated latex and, for larger starting rubber article sizes, may range 2000 micron sieve particle size or less. Preferably, the resulting particle size of the $S^3P$ milled rubber is 100 micron sieve particle size or less, or 46 micron sieve particle size (300 mesh) or more, or 35 micron sized sieve particle size (400 mesh) or more.

The latex (co)polymer used in the composite material may comprise, as copolymerized units, ethylenically unsaturated monomers including, for example, (α,β-ethylenically unsaturated monomers (e.g., primary alkenes); vinylaromatic compounds, such as styrene or substituted styrenes (e.g. α-methyl styrene); ethylvinylbenzene, vinylnaphthalene, vinylxylenes, vinyltoluenes, and the like; butadiene; vinyl acetate, vinyl butyrate and other vinyl esters; vinyl monomers such as vinyl alcohol, vinyl ethers, vinyl chloride, vinyl benzophenone, vinylidene chloride, and the like; allyl ethers; N-vinyl pyrrolidinone; olefins; vinyl alkyl ethers with $C_3$-$C_{30}$ alkyl groups (e.g., stearyl vinyl ether); aryl ethers with $C_3$-$C_{30}$ alkyl groups; $C_1$-$C_{30}$ alkyl esters of (meth)acrylic acid (e.g., methyl acrylate, methyl methacrylate, ethyl (meth)acrylate, butyl (meth)acrylate, 2-ethylhexyl (meth)acrylate, benzyl (meth)acrylate, lauryl (meth)acrylate, oleyl (meth)acrylate, palmityl (meth)acrylate, stearyl (meth)acrylate); hydroxyalkyl (meth)acrylate monomers such as 2-hydroxyethyl acrylate, 2-hydroxyethyl methacrylate, 2-hydroxypropyl (meth)acrylate, 2-hydroxybutyl (meth)acrylate, and 1-methyl-2-hydroxyethyl (meth)acrylate; as well as the related amides and nitriles, such as (meth)acrylamide, substituted (meth)acrylamides (e.g., diacetone acrylamide), or N-alkyl substituted (meth)acrylamides (e.g., octyl acrylamide and maleic acid amide); and acrylonitrile or methacrylonitrile; unsaturated vinyl esters of (meth)acrylic acid; multifunctional monomers (e.g., pentaerythritol triacrylate); monomers derived from cholesterol; ethylene; surfactant monomers (e.g., $C_{18}H_{27}$-(ethylene oxide)$_{20}$ methacrylate and $C_{12}H_{25}$-(ethylene oxide)$_{23}$ methacrylate); α,β-monoethylenically unsaturated monomers containing acid functionality (e.g., acrylic acid and methacrylic acid, acryloxypropionic acid, (meth)acryloxypropionic acid, itaconic acid, maleic acid or anhydride, fumaric acid, crotonic acid, monoalkyl maleates, monoalkyl fumarates, monoalkyl itaconates); acid substituted (meth)acrylates; sulfoethyl methacrylate and unsaturated sulfonic acid monomers; acid substituted (meth)acrylamides (e.g., 2-acrylamido-2-methylpropylsulfonic acid); basic substituted (meth)acrylates (e.g., dimethylaminoethyl methacrylate, tertiary-butylaminoethyl methacrylate); and (meth)acrolein.

The latex (co)polymer of the composite material may further comprise copolymerized functional monomers, or monomers subsequently functionalized, in order to impart preferred properties according to the desired end use of the composite material. Such monomers may include monomers with carboxy acid functionality (for example, ethylenically unsaturated carboxylic acid monomers), or phosphorus acid functionality (phosphorus acid monomers), or monomers with hydroxy functionality, or amine functionality, or acetoacetoxy functionality, or silyl functionality, or epoxy functionality, or cyano functionality, or isocyanate functionality. Examples of functional monomers include (meth)acrylic acid, glycidyl (meth)acrylate, phosphoethyl (meth)acrylate, hydroxyethyl (meth)acrylate, acetoacetoxyethyl (meth)acrylate, and the like. Acrylic latex polymers are especially well suited to the invention because of the variety of functional groups that can be readily incorporated into the polymer backbone.

In one embodiment, the latex (co)polymer of this invention comprises one or more copolymerized multi-ethylenically unsaturated monomers such as, for example, allyl methacrylate (ALMA), allyl acrylate, diallyl phthalate, 1,4-butylene glycol dimethacrylate, 1,2-ethylene glycol dimethacrylate, 1,6-hexanediol diacrylate, butadiene, trimethylolpropane triacrylate (TMPTA) and divinyl benzene. The multi-ethylenically unsaturated monomer can be effectively employed at levels as low as 0.1%, by weight based on the weight of the copolymer, preferably from 0.1 to 10%, or 0.1 to 5%, by weight based on the weight of the copolymer.

Latex (co)polymers that are suitable for use in the present invention include, but are not limited to, all-acrylic latexes; styrene-acrylic latexes; natural rubber latex and derivatized natural rubber latex, such as epoxidized natural rubber latex; synthetic rubber latex, such as isoprenes, butadienes such as styrene-butadiene latex or styrene-acrylonitrile-butadiene latex; and combinations thereof. The latex (co)polymer may be made by any polymerization method, including, for example, solution polymerization, bulk polymerization, heterogeneous phase polymerization (including, for example, emulsion polymerization, mini-emulsion polymerization, micro-emulsion polymerization, suspension polymerization, dispersion polymerization, and reverse-emulsion polymerization), and combinations thereof, as is known in the art. The molecular weight of such latex polymer species may be controlled by the use of a chain regulator, for example, sulfur compounds, such as mercaptoethanol and dodecyl mercaptan. The amount of chain regulator, based on the total weight of all monomers used to make the (co)polymer, may range 20% or less, more commonly 7% or less. The molecular weight of the latex (co)polymer is preferably from about 5,000 to 2,000,000, or, more preferably, from 20,000 and 1,000,000.

The glass transition temperature (Tg) of the polymers is measured by differential scanning calorimetry (DSC). "$T_g$" is the temperature at or above which a glassy polymer will undergo segmental motion of the polymer chain. To measure the glass transition temperature of a polymer by DSC, the polymer sample is dried, preheated to 120° C., rapidly cooled to −100° C., and then heated to 150° C., at a rate of 20° C./minute while DSC data are collected. The glass transition temperature for the sample is measured at the midpoint of the inflection using the half-height method; cell calibration using an indium reference for temperature and enthalpy, as is known in the art. Preferably, the emulsion copolymer used in this invention has a Tg of from −10 to 35° C., although the Tg of the copolymer used in this invention is not particularly limited.

In one embodiment, the latex (co)polymer is obtained from the waste stream of an emulsion polymer manufacturing facility. Advantageously, this allows the production of composite materials made wholly, or partly, from waste products or recycled materials.

The latex (co)polymer used in the composite material preferably comprises 5 wt. % or more, or 95 wt. % or less, or 10 wt. % or more, or 90 wt. % or less of the total solids of the composite, preferably 10 wt. % or more, or 75 wt. % or less, or 25-65%, more preferably 35-65%, or up to 50 wt. %.

The latex (co)polymer used in the composite material is coagulated, or flocculated, to produce a coagulated aqueous polymer dispersion wherein the particles are in the general size range of the starting rubber particles, preferably within one order of magnitude of the particle size of the rubber particles. In addition to providing better mixing of the latex polymer with the rubber particles, coagulation of the latex polymer also helps prevent fouling of the plates during the solid state shear pulverization. The latex (co)polymer may be coagulated before or after mixing with the rubber particles. Methods of coagulating an aqueous polymer dispersion are known in the art, and are not limited herein. Suitable methods of coagulation may include the addition of an acid, such as formic acid or sulfuric acid, or a salt, such as sodium chloride or iron (ferric) chloride. Other chemical coagulants may include alum, alumina, aluminium chlorohydrate, aluminium sulfate, calcium oxide, iron (ferrous) sulfate, magnesium sulfate, polyacrylamide, sodium aluminate, and sodium silicate, and the like; and natural product coagulants may include chitosan, moringa oleifera seeds, papain, strychnos seeds, and isinglass, among others. Preferably, the coagulated aqueous polymer dispersion has an average particle size in the range of from 1 micron to 5,000 microns, and more preferably, from 5 microns to 200 microns, and even more preferably, from 10 microns to 100 microns. Preferably, the coagulated aqueous (co)polymer dispersion is pumpable.

The coagulated aqueous dispersion is combined with particles of the crosslinked rubber to form a mixture in aqueous dispersion, and the mixture subjected to $S^3P$. Suitable techniques include those that can be used to pulverize the mixture as a slurry containing solid particulate matter, and thereby reducing the particle size of the rubber particles while they are in intimate contact with the coagulated polymer. For example, techniques such as solid state shear extrusion, SSSE, which were designed with heating units and, in normal use, used to process the input materials in the molten state, may be used with aqueous slurry mixtures under ambient conditions. Thus, a number of techniques can be used, or adapted to be used, to practice the method of this invention, including, but not limited to, various milling techniques, such as rotating grinding mill, high shear solid state milling, disc milling, pan milling, stone milling, plast milling; as well as other pulverizing techniques, such as the Berstorff pulverizer, extrusion pulverization, solid state shear extrusion, and Brubender Extruder; and similar techniques.

The method of the present invention further includes reducing the moisture content of the pulverized slurry. This may comprise both dewatering the slurry and drying the remaining solid composite material. Dewatering the slurry, in turn, may include such processes as, for example, filtration of the solids to remove excess water, or centrifugation, as well as further reduction of the moisture content of the sample by wringing, or pressing, or freeze-drying. Conventional methods of drying can also be employed including, for example, the use of ovens or dryers such as vacuum dryers, air dryers, drum dryers, or hand dryers. Preferably, the method further comprises thermoplastic processing of the coagulated, pulverized aqueous dispersion, and further reduction of water content may occur during such processing, for example, by compressing the sample at temperatures above room temperature. Processing of the thermoplastic material, which may be carried out at elevated temperature, may include the steps of kneading or forming the composite material. Kneading may be accomplished using a two-roll mill, or by extrusion of the material, or, in some cases, at delivery to an injection molder. The forming process may include such techniques as calendering, compression molding, or injection molding. Two-roll milling is a standard polymer processing operation often used in conjunction with compression molding to transform the material into a molded article. Alternatively, extrusion or a similar melt-processing procedure can be used.

The slurry mixture may additionally comprise various additives as desired or required according to the end use of the composite material, such as, for example, one or more of vulcanizing agent, antioxidant, UV-stabilizer, fire-retardant, colorant, filler, pigment, and processing aid.

In a particularly preferred embodiment, ground tire rubber of 203 micron sieve particle size (60 mesh) is added, on an equal solids basis, to a 10% solids aqueous dispersion of an acrylic latex copolymer, such as Rhoplex™ AC261 (available from Rohm and Haas Company, Philadelphia, Pa.), and the latex is coagulated in situ by the addition of a 40% solution of ferric chloride as described below in Example 1(a). The slurry is subjected to solid state shear pulverization as described in Example 2, then filtered and dried before being processed in a two-roll mill and compression molded, as described in Example 3(a) below, to produce the acrylic rubber composite.

The composite material produced by the process of the present invention is a thermoplastic material that can be, optionally, further formulated and compression molded to provide the desired end product, which is not limited in any particular way to one skilled in the art. In some applications, the composite material may additionally comprise fillers in the form of, for example, powders, fibers, slivers or chips; or reinforcing materials, such as non-wovens, or scrim, and the like, as known in the respective arts. Carbon Black is an example of a filler that is used in many of the end products envisioned. Useful end products include, but are not limited to, automotive parts, such as tires, bumpers, gaskets, fan belts, wiper blades, liners, vibration-dampening mounts, underbody coating, insulation and trim; building products such as roofing membranes, roofing shingles or roofing felt; modifier for EPDM roofing membrane; coatings; modifier for neoprene coatings; tiles or tile backings; carpet backings; asphalt sealer, asphalt reinforcement and asphalt concrete road surfacing material; crack filler for asphalt and cement; concrete modification; sound proofing materials; acoustic underlayment; flooring underlayment and matting; industrial products such as liners for landfill; hot melt adhesives; sports utilities such as artificial turf and track; playground surfaces; mats and pads; ball cores; and consumer products such as floor tiles; shoe soles; liners; covers; molded products; and the like.

EXAMPLES

Example 1

Preparation of Polymer/Rubber Slurry Mixture: 1(a)
In-Situ Coagulation

A commercial acrylic latex polymer, Rhoplex™ AC261 latex (50% solids emulsion copolymer of butyl acrylate and methyl methacrylate; Rohm and Haas Company, Philadelphia, Pa.), and Ground Tire Rubber (203 micron sieve particle size; i.e. 60 mesh; from Lv Huan Rubber Powder Limited Company, Zhejiang, China), were used in the slurry mixture as follows: 1000 g of Rhoplex™ AC261 latex was diluted with 3500 g of water in a two gallon container. 500 g of Ground Tire Rubber was added gradually to the diluted latex, while stirring, over a 10 minute period. After the crumb tire rubber is dispersed in the latex dispersion, 37.6 g of a 40% solution of iron(III) chloride, $FeCl_3$, was added to the dispersion to initiate the coagulation of the latex. The stirring was continued for 15 minutes and the slurry mixture was allowed to equilibrate overnight. The coagulated mixture settled into a solid cake but can be redispersed readily into a flowable slurry with agitation. The particle size of the coagulated polymer solids was estimated by optical microscope to be around 10-200 microns. Additionally, the particle size and particle size distribution of the coagulated mixture was measured using a Malvern Mastersizer 2000™ Particle Size Analyzer (Malvern Instruments Ltd., Malvern, Worcestershire, UK). The result showed an overlapping bimodal distribution with the lower particle size distribution showing a broad distribution of particles from 1 micron to 1,000 microns with >80% between 2-200 microns and with a peak at ~25 microns. The latter distribution was determined to be that of the coagulated latex polymer (see below, 1(b)).

Preparation of Polymer/Rubber Slurry Mixture: 1(b)
Pre-Coagulation of the Latex

In an alternative procedure, the slurry as described in Example 1a) was also prepared by coagulation of the latex followed by the addition of Ground Tire Rubber, as follows: 1000 g of Rhoplex™ AC261 latex (50% solids) was diluted with 3500 g of water in a two gallon container. 37.6 g of a 40% solution of $FeCl_3$ was added to the dispersion to initiate the coagulation of the latex. The stirring was continued for 15 minutes and the coagulated polymer dispersion was allowed to equilibrate overnight. 500 g of Ground Tire Rubber (203 micron sieve particle size; i.e. 60 mesh) was added gradually to the coagulated polymer dispersion with stirring over a 10 minute period. The particle size of the coagulated polymer solids was estimated by optical microscope to be around 10-200 microns. Additionally, the particle size and particle size distribution of the coagulated dispersion was measured using a Malvern Mastersizer 2000™ Particle Size Analyzer. The result showed a broad distribution of particles from 1 micron to 1,000 microns with >80% between 2-200 microns and with a peak at ~25 microns.

Example 2

Solid State Shear Pulverization ($S^3P$) of
Polymer/Rubber Slurry Mixture

The slurry from Example 1(a) and, separately, Example 1(b), was subjected to solid state shear pulverization under wet condition using a Pan Mill method as described in Plastics, Rubber and Composites Processing and Applications, 1996 Vol. 25, No. 3, 152-158; Polymer Engineering and Science, 1997, Vol. 37, No. 6, 1091-1101. In each case, the polymer/rubber slurry was diluted to 10% total solids and fed into the intake of the Pan Mill. The milling was carried out under ambient conditions with the moving pan rotating at 60 rpm. The gap between the pans was controlled by a fluid driving device to achieve efficient pulverization of the polymer/rubber mixture. The slurry was milled 5 times by reintroducing the discharge of the milled slurry back into the mill.

Example 3

Preparation of Polymer/Rubber Composite Articles:
3(a) 2-Roll Milling and Compression Molding The milled polymer/rubber slurry mixture was filtered using a 10 micron filter bag and the solid mixture was further wrung out to reduce the free water. The resulting moist solid (~50-60% moisture content) was dried in a vacuum oven at 70° C. for 2 days. The dried mixture solid (<5% moisture content) was processed in a two-roll mill at 190° C. for 5 minutes and compression molded between steel plaques fitted with a 0.102, 0.127, or 0.203-cm thick (40, 50 or 80-mil thick), 25.4 cm by 25.4 cm (10 inch by 10 inch) frame at 190° C. for a total of 5 minutes: 3 minutes at low pressure (10-15 tons) and 2 minutes at high pressure (75 tons). Additional cooling was also performed under pressure (75 tons) at room temperature for 5 minutes in a cool press fitted with circulating water.

3(b): Extrusion Preparation of Polymer/Rubber
Composite Articles

In an alternative procedure to prepare the polymer/rubber composite articles, the dried mixture solid was also processed by extrusion directly, without going through the two-roll milling step. The dried polymer/rubber composite was extruded using a Haake counter-rotating conical twin screw, with two tapered 1.9 cm (¾ inch) diameter screws rotating at 40 rpm. The main unit contained three heating zones (185-190-195° C.) and various thermocouples and cooling hoses for temperature control. The material was extruded through a 5 cm (2 inch) wide lip die with a gap size of 0.102 cm (40 mils).

Example 4

Properties of Polymer/Rubber Composite Article:
4(a) Mechanical Properties

Composite samples from Example 3(a) (except sample 6, below, which was prepared by the process of Example 3(b)) were cut in a dog-bone fashion from the molded plaques, so that a width of about 0.35 cm (0.14 inches) was obtained, and a thickness of 0.102 cm (40 mils). Mechanical testing was carried out following the ASTM D-628 protocol on a Tinius Olsen H50KS tensile tester (Tinius Olsen Inc., Horsham, Pa.), using the Type 5 setting for rubbers. The crosshead rate was 0.76 cm/min (0.3 inches/minute), and a gauge length of 0.76 cm (0.3 inches) was used. The test was run under controlled temperature of 23° C. and controlled relative humidity of 50%. From this test, the elongation at break, maximum stress (tensile strength), modulus of elasticity (tangent modulus), and break energy for the samples were determined.

TABLE 1

Mechanical Properties of Composite Materials from AC-261 and GTR

| Sample | Polymer/Rubber (wt. %) | Tensile Strength Max (psi) | Elongation at Break (%) | Modulus (psi) |
|---|---|---|---|---|
| 1 | 0/100 | 340 | 175 | 740 |
| 2 | 25/75 | 684 | 182 | 5124 |
| 3 | 50/50 | 1305 | 252 | 7272 |
| 4 | 75/25 | 1549 | 243 | 9910 |
| 5 | 100/0 | 1809 | 352 | 15794 |
| 6 | 50/50* | 1368 | 242 | 12748 |

*Prepared by Extrusion (Ex. 3b). All other samples prepared by compression molding (Ex. 3a).

Properties of Polymer/Rubber Composite Article:
4(b) Effect of Coagulation of the Latex Polymer The milled polymer/rubber slurry mixtures, with and without the coagulation step as described in Example 1(b), were dewatered by filtration with a 10 micron filtration bag.

The slurries consisted of 10 weight percent of polymer solids and 10 weight percent of ground tire rubber. The solids in the coagulated slurry sedimented on standing, with a slightly turbid top layer. The slurry without coagulation showed sedimentation of the ground tire rubber with a white water layer. After filtering, the solid contents of the filtrate of the two slurries were determined gravimetrically (Table 2).

TABLE 2

Effect of Coagulation of Latex Polymer
on Filtrate Solids After Filtering

| | | Solids in Filtrate After Filtering |
|---|---|---|
| Inventive Process | With Coagulation | 0.5% |
| Comparative Process | Without Coagulation | 8% |

Without coagulation, the latex polymer solids essentially pass through the filter and the filtrate solids are almost unaltered with respect to the latex polymer.

The ability to isolate the solids in the slurry allows the composite mixture to be washed. The residual hydrophilic components in the slurry, such as the coagulants and surfactants, can affect the final product negatively. The coagulated composite mixture was filtered through a 10 micron filtration bag and the solids then redispersed in water and refiltered twice, effectively washing the sample to remove residual hydrophilics. The composite mixture was processed as described in Example 3(a). The water sensitivity of the final solid composite materials, after compression molding, was determined by soaking a piece of the molded composite in water and then, after drying off the surface water, measuring the water absorption over time. The water absorption was calculated as the weight % of water absorbed relative to the weight of the composite.

TABLE 3

Effect of Washing Slurry Components on the
Water Absorption of Polymer Composites

| | Water Absorption (wt. %) | |
|---|---|---|
| | 10 day soak | 20 days soak |
| Composite with no wash | 3.9 | 5.5 |
| Composite washed twice | 2.0 | 2.3 |

The composite material prepared from solids that were filtered out and redispersed in water (and therefore washed) showed much lower water absorption upon prolonged soaking. Many industrial applications of polymeric materials or composites, such as roofing applications, require minimal water absorption, for example less than 5% water absorption upon soaking in water over a period of 7 days, or over a period of 20 days, or longer, as the application may dictate.

Properties of Polymer/Rubber Composite Article:
4(c) Effect of Solid State Shear Pulverization ($S^3P$)

Samples of the 50/50 coagulated polymer/rubber slurry mixture (from Example 1(a)) were used to make polymer composites via four different methods. Two methods included the $S^3P$ technique, and two other methods did not; and for each scenario, one sample was subjected to the two-roll milling treatment and compression molding, and the other sample was simply compression molded (without the two-roll milling), see Table 4, below. The polymer composites were otherwise prepared identically. Mechanical properties were tested for the polymer composites formed by the four different methods.

TABLE 4

Mechanical Properties of Polymer Composites

| $S^3P$ | Two-roll milling | Tensile Strength | Elongation (%) |
|---|---|---|---|
| Yes | Yes | 1203 | 334 |
| Yes | No | 873 | 169.7 |
| No | Yes | 928 | 167 |
| No | No | 632 | 135.9 |

The method employing both $S^3P$ and two-roll milling produces composites with superior tensile strength and elongation. Use of just one of the two techniques results in polymer composites with intermediate mechanical properties. On the other hand, if the material is pressed without S³P or two-roll-milling, the mechanical properties are comparatively deficient. The data shows that the S³P technique makes a key difference in the final properties of the material.

Example 5

Composite Materials Prepared from Latexes of Varying Polymer Composition

The composite materials can be prepared with a range of other latex polymers including Rovace™ 661 (Vinyl Acetate/Butyl Acrylate, 55% solids; Rohm and Haas Company, Philadelphia, Pa.); Airflex™ 500 (Ethylene/Vinyl Acetate, 55% solids; Air Products and Chemicals, Inc., Allentown, Pa.); UCAR™ DM171 (Styrene/Butadiene Rubber, 50% solids; Dow Chemical Company, Midland, Mich.) and Rhoplex™ 2200 (Styrene/Acrylic, 50% solids; Rohm and Haas Company). The polymer/rubber slurry mixtures are prepared for each latex polymer according to the quantities indicated in Table 5 and by the method as described in Example 1(a).

TABLE 5

Slurry Compositions for Various Polymer Latexes (amounts in grams)

|  | Water | Latex | GTR | FeCl₃ Soln. |
|---|---|---|---|---|
| Rovace ™ 661 | 3591 | 909 | 500 | 37.5 |
| Airflex ™ 500 | 3591 | 909 | 500 | 37.5 |
| UCAR ™ DM171 | 3500 | 1000 | 500 | 37.5 |
| Rhoplex ™ 2200 | 3500 | 1000 | 500 | 37.5 |

The polymer/rubber slurries shown in Table 5 are further processed by the methods described in Examples 2 and 3 to produce composite materials.

Example 6

Composite Materials Prepared from Waste Material from Industrial Emulsion Polymer Manufacturing Facility In this example, a polymer/rubber slurry mixture was prepared by the method of Example 1(b) using the waste material derived from an emulsion polymer manufacturing facility. The waste material from such a facility is routinely produced from the rinsing of emulsion polymerization reactor vessels, and contains a very low level of polymer solids (<2%) from a mixture of latex products designed for applications ranging from adhesives to coatings (Tg −40 to 40° C.). Typically, at the manufacturing facility, these polymer containing rinse waters are coagulated (for example, with FeCl₃) and dewatered to ~30% solids before disposal. In this example, the dewatered coagulated waste material was used to prepare a polymer/rubber slurry by redispersing the wet solids extracted from the waste collection along with GTR (203 micron sieve particle size; i.e. 60 mesh), added at a similar solids level, and then milling and processing the polymer/rubber mixture according to Example 2 and 3(a). The resulting composite sheet derived from the waste emulsion polymers and GTR, after compression molding, has similar integrity as that in Example 4 from AC261, although with lower mechanical properties.

TABLE 6

Mechanical Properties of Composite Materials from Waste Emulsion Polymers and GTR

| Polymer/Rubber (wt. %) | Tensile Strength Max (psi) | Elongation at Break (%) | Modulus (psi) |
|---|---|---|---|
| 25/75 | 464 | 151 | 2699 |
| 50/50 | 766 | 225 | 3440 |
| 75/25 | 469 | 149 | 3352 |

As shown in Table 6, polymer rubber composites according to the present invention obtained good mechanical properties at all recycled crosslinked rubber proportions tested. The 50/50 w/w polymer rubber composite exhibited excellent mechanical properties, particularly for a material having such a high waste rubber content.

The invention claimed is:

1. A method of making a composite material comprising
   (a) coagulating one or more aqueous polymer dispersion to produce a coagulated polymer dispersion with a weight average particle size of from about 1 micron to about 1,000 microns;
   (b) combining particles of one or more crosslinked rubber with the coagulated aqueous polymer dispersion to form an aqueous dispersion mixture in aqueous dispersion;
   (c) subjecting the aqueous dispersion mixture to solid state shear pulverization; and
   (d) reducing the moisture content of the mixture.

2. The method of claim 1 further comprising kneading the mixture prior to forming an article.

3. The method of claim 1 wherein the coagulating of the one or more aqueous polymer dispersion is carried out in the presence of the particles of one or more crosslinked rubber to form the mixture in aqueous dispersion.

4. The method of claim 1 wherein the particle size of the crosslinked rubber is from 150 micron sieve particle size (80 mesh) to 11,100 micron sieve particle size (2 mesh).

5. The method of claim 4 wherein the crosslinked rubber is obtained, at least in part, from recycled tires.

6. The method of claim 1 wherein the aqueous polymer dispersion that is coagulated is obtained from an emulsion polymer dispersion.

7. The method of claim 1 wherein the coagulated aqueous polymer dispersion is obtained from the waste stream of an emulsion polymer manufacturing facility.

8. The method of claim 1 wherein reducing the moisture content of the mixture comprises isolating the solid content of the mixture.

9. The method of claim 1 wherein the solid state shear pulverization comprises pan milling or disk milling.

10. The method of claim 1 wherein the coagulated aqueous polymer dispersion comprises a copolymer having polymerized units of one or more functional monomers with functionality chosen from carboxy acid functionality, phosphorus acid functionality, hydroxy functionality, amine functionality, acetoacetoxy functionality, silyl functionality, epoxy functionality, cyano functionality, isocyanate functionality, and combinations thereof.

* * * * *